United States Patent [19]
Provenzano et al.

[11] 3,759,082
[45] Sept. 18, 1973

[54] APPARATUS FOR TESTING STRESS-SENSITIVE SEMICONDUCTOR TRANSDUCER

[75] Inventors: Joseph Charles Provenzano, Glenview; David F. Hiestand, Lombard; James A. Krabec, Chicago, all of Ill.

[73] Assignee: GTE Automatic Electric Laboratories Incorporated, Northlake, Ill.

[22] Filed: Jan. 20, 1972

[21] Appl. No.: 219,352

[52] U.S. Cl. .................................. 73/1 B, 73/94
[51] Int. Cl. ........................................ G01l 25/00
[58] Field of Search ............... 73/1 B, 141 R, 94, 73/141 A, 141 AB

[56] References Cited
UNITED STATES PATENTS

| | | | |
|---|---|---|---|
| 3,285,065 | 11/1966 | Ragen et al. | 73/161 |
| 3,065,625 | 11/1962 | Brown | 73/94 X |
| 3,485,092 | 12/1969 | Benner | 73/141 AB X |

*Primary Examiner*—Jerry W. Myracle
*Attorney*—K. Mullerheim et al.

[57] ABSTRACT

A motor driven force transducer applies stress at a selected rate to a substrate bearing a stress-sensitive test specimen. The analog electrical outputs of the specimen under test and the force transducer are converted to digital form for correlation by a computer.

10 Claims, 2 Drawing Figures

Patented Sept. 18, 1973 3,759,082

APPARATUS FOR TESTING STRESS-SENSITIVE SEMICONDUCTOR TRANSDUCER

BACKGROUND OF THE INVENTION

1. Field of the Invention

The present invention relates most generally to the field of electromechanical transducers and more particularly to apparatus for the testing of stress-sensitive semiconductor transducers.

2. Description of the Prior Art

The metal insulator piezoelectric semiconductor (MIPS) transducer is a vacuum deposited thin film transistor and is a stress-sensitive device due to its piezoelectric semiconductive properties. Such transducers are typically deposited on a thin glass substrate and heretofore have been difficult to evaluate as to their actual stress-sensitivity. By mechanically stressing the glass substrate upon which a number of transducers have been deposited a detectable change is induced in the electrical properties of the transducers. These electrical changes must, however, be related to the applied stress in order that the stress-sensitivity may properly be evaluated.

Prior to the present invention various arrangements have been used to evaluate the stress-sensitivity of piezoelectric elements. Typically, these testing devices have included a diaphragm and stylus arrangement whereby the stylus applies a stress to a semiconductor junction when pressure is applied to the diaphragm. Unfortunately, however, this approach does not permit accurate monitoring of the level of applied stress. This deficiency, in turn, degrades the accuracy with which the transducer output and the applied stress may be correlated and thus the stress-sensitivity measurement accuracy is impaired. The previously available stress-sensitivity measurement devices have further been generally incompatible with the available digital data processing techniques for correlating transducer output with the stress input.

OBJECTS AND SUMMARY OF THE INVENTION

From the foregoing discussion it will be apparent that among the objectives of the present invention are included the following:

the provision of a new and novel apparatus for testing the stress-sensitivity of electromechanical semiconductor transducers;

the provision of apparatus of the above-described character useful in the testing of thin film stress-sensitive semiconductor transducers;

the provision of apparatus of the above-described character having improved correlation of transducer output with stress input; and the provision of apparatus of the above-described character which is compatible with digital data processing techniques.

These and other objectives of the present invention are efficiently achieved by providing a force transducer to which a stress applying anvil is affixed at one end. The anvil of the force transducer is driven via a variable speed reversible motor and gear train to apply stress to the transducer substrate. The output of the force transducer and the electrical outputs of the stressed transducers are coupled via analog-to-digital conversion circuitry to a digital computer for correlation, storage and/or display.

The foregoing as well as other objects, features and advantages of the present invention will become more fully understood from the following detailed description taken in conjunction with the appended drawings.

DESCRIPTION OF PREFERRED EMBODIMENT

Figure 1:
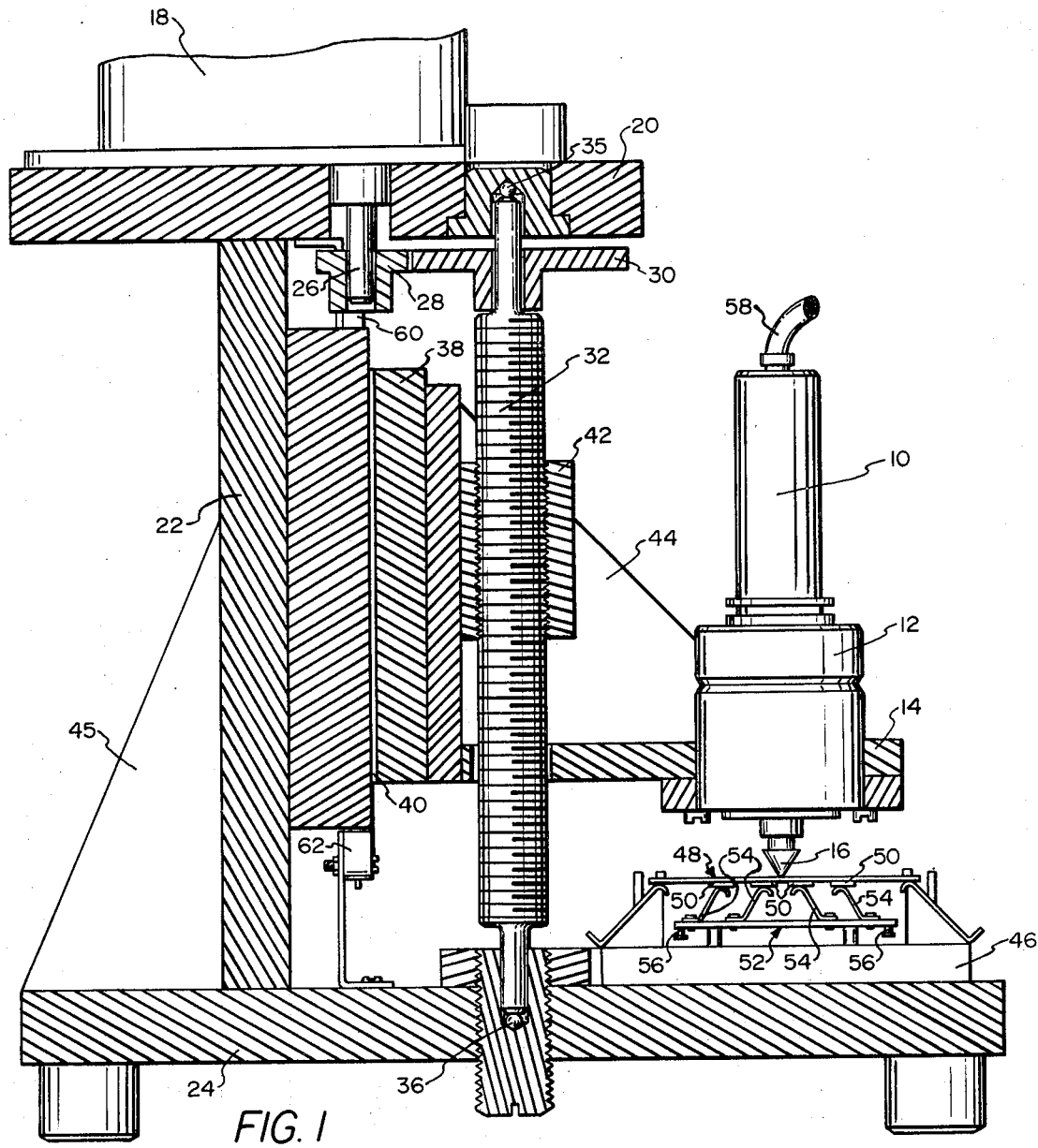
FIG. 1 is a schematic side elevation view of a stress-sensitivity measuring apparatus in accordance with the present invention.

Turning now to FIG. 1 there is illustrated a force transducer 10 attached at one end to a load cell 12 which is in turn disposed in a support member 14. A stressing anvil 16 is disposed on the lower surface of the load cell 12. A variable speed reversible motor 18 is disposed on a mounting plate 20 which is supported by an upright support member 22 affixed to a base plate 24. The shaft 26 of motor 18 extends through the mounting plate 20 and is provided with a pinion gear 28. A reduction gear 30 engages the pinion gear 28 and is disposed at the upper end of an actuator screw 32. The actuator screw 32 is held between the motor support plate 20 and the base plate 24 and is rotatable about its longitudinal axis on upper and lower thrust bearings 35 and 36 respectively.

The transducer support member 14 is affixed to a precision slide 38 disposed in a longitudinal slot 40 in the upright support member 22. An internally threaded pillow block 42 is disposed about the actuator screw 32 and is fixed to the slide 38. To provide additional rigidity a reinforcing plate 44 may be fixed to the slide 38 and transducer support member 14, and another reinforcing plate 45 may be placed between the upright member 22 and base plate 24.

With the foregoing construction when the motor 18 is actuated the pinion driving gear 28 drives the reduction gear 30 and thus the actuator screw 32. In this manner the pillow block 42, slide 38 and transducer support arm 14 are driven longitudinally. A substrate holder 46 is disposed on the surface of base plate 24 in alignment with the stressing anvil 16. The substrate holder 46 is adapted to receive a substrate 48 on which have been deposited one or more stress-sensitive semiconductor transducers 50. A printed wiring card 52 is provided with a plurality of spring contact elements 54 in a pattern corresponding to the pattern in which the transducers 50 are deposited on the substrate 48. Electrical signals are thus taken from the transducers 50 via the spring contact elements 54 and printed circuitry to output terminals 56 which are coupled via analog-to-digital conversion circuits to digital data processing apparatus. The electrical output of the force transducer 10 is also coupled through output lead 58 and conditioning circuits to the data processor. As a safety precaution upper and lower limit switches 60 and 62 respectively may be provided to sense travel of the slide 38 and thus stressing anvil 16 to a maximum upper or lower position. The limit switches 60 and 62 may be coupled to the motor 18 and operate to stop and/or reverse its operation when actuated.

In practice it has been found by the Applicants that a model GT two speed drive motor 18 commercially available from Hurst Manufacturing Company of Princeton, Indiana operating through a reduction gear ratio of 3:1 is satisfactory to drive the stressing anvil 16 at rates of 12.5 and 25 mils per minute. These speeds have proven in experiments conducted by the Applicants to be appropriate for stressing typical glass substrates having thin film metal insulator piezoelectric semiconductor transducers deposited thereon. It will be apparent, however, that should it be desired to test other types of stress-sensitive transducers; e.g. semiconductor junctions or piezoelectric crystals, other stressing rates may easily be provided. One force transducer which has been found by the Applicants to be useful in the practice of their invention is a model No. UL4–50 together with a load cell model No. UC–3 both of which are available from Minneapolis Honeywell Company of Minneapolis, Minnesota.

Figure 2:
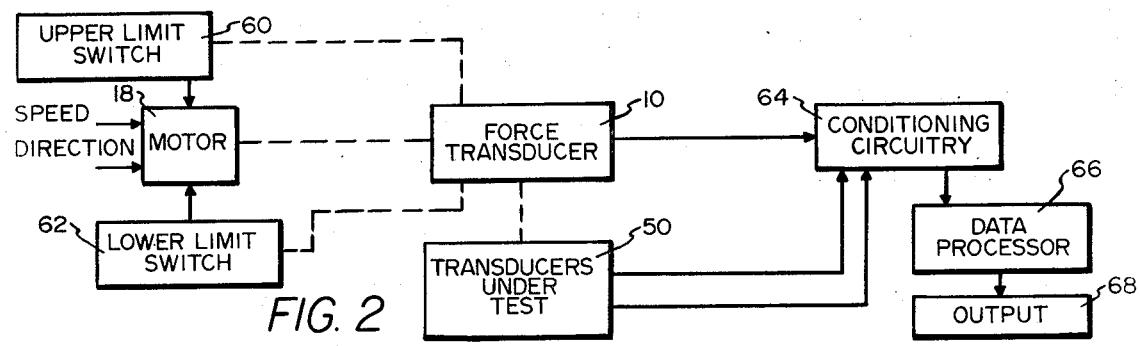
FIG. 2 is a schematic block diagram of the apparatus of the present invention.

FIG. 2 illustrates in simplified block diagram form the various elements of the present invention. Blocks representing elements shown in FIG. 1 are identified with like reference numerals. As described above the motor 18 drives the force transducer 10, with its associated load cell and stressing anvil, into mechanical contact with the substrate of the transducers. The upper and lower limit switches 60 and 62 are mechanically coupled to the force transducer 10 and electrically coupled to the motor 18. Each operates to preclude overtravel of the force transducer 10 in its respective direction. The electrical outputs of the force transducer 10 and the stress-sensitive transducer 50 under test are coupled via analog-to-digital conversion circuitry 64. The digital outputs of the conversion circuitry 64 represent the applied stress as sensed by the force transducer 10 and the electrical response of the transducers 50 under test to that applied stress. These digital signals are coupled to digital data processing apparatus 66 for correlation and/or storage. The data processor 66 is of a conventional type and may, for example, be a model PDP80 which is commercially available from Digital Equipment Corp. of Maynard, Massachusetts. The output of the data processor 66 may then be applied to any suitable output means 68 such as a cathode ray tube display, teleprinter or the like.

It will thus be seen that the Applicants have provided a new and novel apparatus for testing the stress-sensitivity of stress-sensitive semiconductor transducers whereby the objectives set forth herinabove are efficiently met. Since certain changes will occur to those skilled in the art without departure from the scope of the invention it is intended that all matter set forth in the description or shown in the appended drawing shall be interpreted as illustrative and not in a limiting sense.

Having described what is new and novel and desired to secure by Letters Patent, what is claimed is:

1. Apparatus for testing the stress-sensitivity of stress-sensitive semiconductor transducers, which produce electrical output signals proportional to the level of stress applied thereto, said apparatus comprising
   a stress-sensitive semiconductor transducer to be tested,
   means for supporting said stress-sensitive transducer in a fixed position,
   a force transducer including a load cell, adapted to be driven at a selected rate with respect to said stress-sensitive transducer, and operative to produce an electrical output signal indicative of the level of force sensed thereby,
   a stressing member coupled to one end of said force transducer and being driven therewith,
   means for driving said force transducer and stressing member with respect to said stress-sensitive transducer to thereby apply stress thereto,
   first output means coupled to said force transducer,
   second output means contacting said stress-sensitive transducer for coupling electrical output signals therefrom, and
   means coupled to said first and second output means for correlating said force transducer output signals and said stress-sensitive transducer output signal.

2. Apparatus as recited in claim 1 further including means coupled to said correlating means for displaying the output signal of said stress-sensitive transducer as a function of the output signal of said force transducer.

3. Apparatus as recited in claim 1 wherein said correlating means includes
   an analog-to-digital conversion circuit coupled to the outputs of said stress-sensitive transducer and said force transducer, and operative to convert the electrical output signals therefrom to binary form and
   digital data processing means for correlating the binary outputs of said conversion circuit.

4. Apparatus as recited in claim 1 wherein said driving means comprises
   a threaded actuator member disposed substantially parallel to the longitudianl axis of said force transducer, fixed in translation and adapted to be driven in rotation about its own longitudianl axis,
   means for mounting said force transducer, said mounting means fixed in rotation, adapted for longitudinal translation substantially parallel to said actuator member and including a threaded portion engaging said threads of said actuator member, and
   means for driving said actuator member in rotation whereby said force transducer mounting means is driven in translation.

5. Apparatus as recited in claim 4 wherein
   said actuator member driving means is a variable speed reversible electric motor.

6. Apparatus as recited in claim 5 further including
   first and second limit switches disposed in a preselected relationship with respect to said force transducer mounting means to sense translation thereof to preselected limits, coupled to said motor, and operative to reverse said motor.

7. Apparatus as recited in claim 5 further including
   a reduction gear assembly including a driving pinion gear engaging said motor, and a driven gear engaging said actuator member.

8. Apparatus as recited in claim 1 wherein
   said stress-sensitive transducer is a thin film transducer deposited on a transducer substrate, and
   said stressing member is driven into contact with said substrate thereby applying stress through said substrate to said stress-sensitive transducer.

9. Apparatus as recited in claim 8 wherein
   said transducer supporting means comprises means for supporting said substrate at the periphery thereof with said transducer disposed on the surface of said substrate opposite that in contact with said stressing member.

10. Apparatus as recited in claim 9 wherein said second output means comprises
    a printed wiring card disposed within said substrate supporting means and having an output electrical circuit disposed thereon, an electrical spring contact disposed on said printed wiring card in electrical continuity with said output circuit, and adapted to engage said stress-sensitive transducer and couple the output signal therefrom, and means for coupling said output circuit to said correlating means.

* * * * *